No. 819,300. PATENTED MAY 1, 1906.
W. H. MITCHELL & J. A. ISAMAN.
GATE.
APPLICATION FILED DEC. 11, 1905.

Witnesses
Geo Hilton
C. N. Griesbauer

Inventors
W. H. Mitchell and
J. A. Isaman,
by H. B. Willson
Attorney

No. 819,300. PATENTED MAY 1, 1906.
W. H. MITCHELL & J. A. ISAMAN.
GATE.
APPLICATION FILED DEC. 11, 1905.

2 SHEETS—SHEET 2.

Witnesses
Geo. Hilton
C. H. Griesbauer

Inventors
W. H. Mitchell and
J. A. Isaman,
by H. B. Willson
Attorney

UNITED STATES PATENT OFFICE.

WILLIAM H. MITCHELL AND JOSHUA A. ISAMAN, OF AURORA, NEBRASKA.

GATE.

No. 819,300. Specification of Letters Patent. Patented May 1, 1906.

Application filed December 11, 1905. Serial No. 291,323.

*To all whom it may concern:*

Be it known that we, WILLIAM H. MITCHELL and JOSHUA A. ISAMAN, citizens of the United States, residing at Aurora, in the county of Hamilton and State of Nebraska, have invented certain new and useful Improvements in Gates; and we do declare the following to be a full, clear, and exact description of the invention, such as will enable others skilled in the art to which it appertains to make and use the same.

This invention relates to improvements in swinging gates.

The object of the invention is to provide a gate which may be opened by a person in an approaching vehicle or by an equestrian without alighting or dismounting, means being provided whereby the gate will be raised or elevated simultaneously with the opening of the same, thereby permitting the gate to swing freely over snow, ice, or other obstruction.

A further object is to provide a spring-projected latch-bar and automatic gravity-operated keeper-plates adapted to be engaged and operated by said spring-projected latch-bar to catch and hold the latter and said gate in a closed or opened position.

With the above and other objects in view the invention consists of certain novel features of construction, combination, and arrangement of parts, as will be hereinafter described and claimed.

Figure 3:
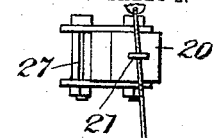
Figure 3:
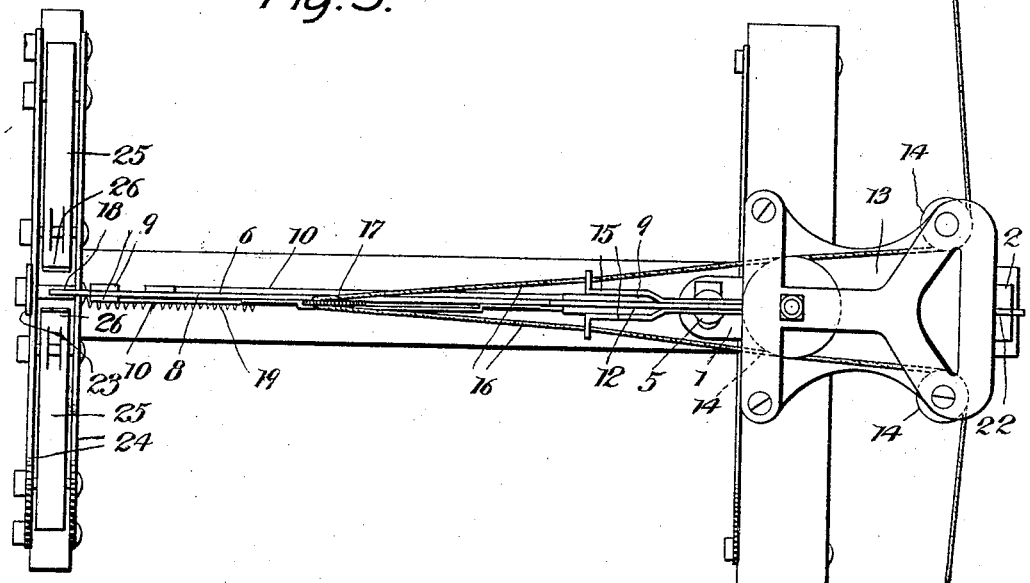
Figure 4:
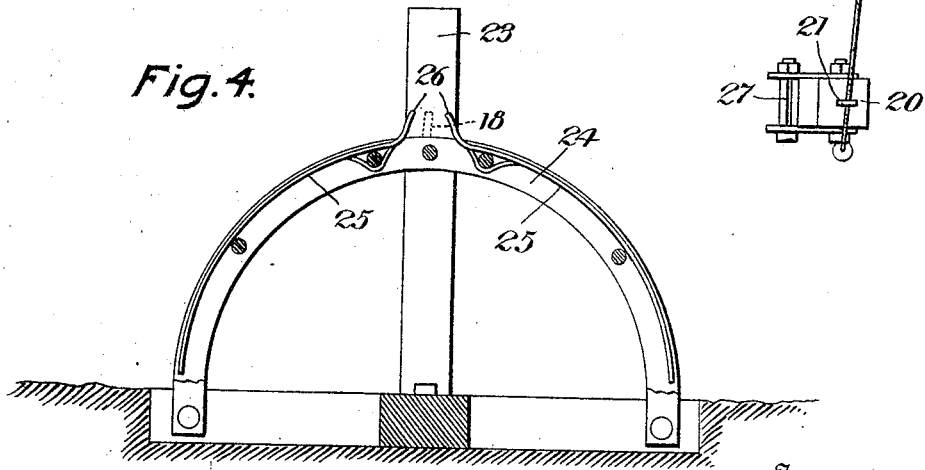

In the accompanying drawings, Figure 1 is a side view of a gate constructed in accordance with the invention, showing the same in its normal closed position. Fig. 2 is a similar view showing the gate in an elevated position to permit the same to be swung over snow, ice, or other obstructions. Fig. 3 is a top plan view, and Fig. 4 is a vertical sectional view through the automatically-operating keeper-plates on the latch-post.

Referring more particularly to the drawings, 1 denotes the hinge-post, which is supported by suitable brace-bars 2 and is provided with right-angularly-projecting side brackets 3. Secured in the brackets 3 and in a suitable bearing-socket 4 is a vertically-disposed pivot-bar or pintle 5, on which is slidably mounted the gate 6. Said gate is provided with loop-shaped hinge members 7, by means of which it is slidably connected to the pintle 5. The gate 6 may be of any suitable construction, the same being here shown as formed of longitudinal horizontal bars 8, connected together at their ends by vertical cross-bars 9 and by segmental brace-bars 10.

The upper end of the pivot-bar or pintle 5 is slotted or bifurcated, and in said bifurcated upper end is pivotally mounted an operating-lever 12. The latter is connected at its inner end to the extended upper end of one of the segmental brace-bars of the gate, whereby an evenly-balanced connection will be had between said lever and the gate to enable said gate to be raised squarely or perpendicularly upon the pintle-bar 5. On the outer end of the lever 12 is secured a frame 13, in which are journaled guide-rollers 14. To the inner end of the lever 12 are connected laterally-projecting guide-brackets 15, through which and around said guide-rollers 14 are passed flexible operating elements, which are here shown in the form of cords or cables 16. The inner ends of the latter are connected to a pivotally-mounted lever 17, the lower end of which is pivotally connected to the inner end of a slidably-mounted latch-bar 15. To the lever 17 above and adjacent to its pivotal connection with the latch-bar is connected one end of a coil-spring 19, the opposite end of which is connected to the outer cross-bar 9 of the gate. The tension of the spring 19 is exerted to normally project the latch-bar 18 to a locking position.

The cords or cables 16 extend from the guide-rollers 14 of the lever 12 to supporting-posts 20, which are located on either side and at a suitable distance from the hinge-post 1. The posts 20 are provided on their upper ends with guide-eyes 21, through which the cords or cables 16 pass, the ends of said cables hanging down on the posts 20 in position to be conveniently grasped by an approaching driver or rider. To the outer end of the operating-lever 12 may also be connected a cord or cable 22, by means of which it may be tilted or rocked to elevate or raise the gate to the position shown in Fig. 2 of the drawings.

Adjacent to the free end of the gate 6 when the latter is in closed position is arranged a latch-post 23, to which is connected an arched frame 24, in which are pivotally mounted curved keeper-plates 25. The upper ends of the keeper-plates 25 are bent to extend upwardly in a substantially vertical position, the extreme upper ends of said plates being curved inwardly, as shown at 26. The lower ends of the keeper-plates 25 below the pivotal connection of the latter are considerably longer than the portions of the levers above the pivotal connection, thus causing an overbalancing of the keeper-plates, so that when the upper ends of the same are engaged by the end of the latch-bar and tilted to permit the passage of said latch-bar said keeper-plates will automatically assume their original positions after the passing of said end of the latch-bar, thus holding the latter in confinement between said upwardly-projecting ends of the plates and preventing the opening of the gate until said latch-bar has been retracted.

Pivotally mounted on the supporting-posts 20 are keeper-plates 27, which are arranged in the path of and adapted to be engaged by the latch-bar when the gate is swung to an open position in either direction, thereby holding said gate open. The plates 27 are pivoted to swing in brackets extending out from the post 20.

In operation to open the gate when approaching in one direction or the other one of the operating cords or cables 16 is pulled, which operation first rocks the latch-bar lever and retracts the latch-bar from engagement with the keeper-plates, after which a further drawing or pulling of the cable 16 will cause the gate to swing to an open position and the latch-bar 18 to automatically engage one or the other of the keeper-plates 27 on the supporting-posts 20. When it is desired to elevate or raise the gate to permit the same to swing freely over snow, ice, or other obstruction, the operating-cord 22 is pulled downwardly, thus rocking the lever 12 and raising the gate, as hereinbefore described.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claim.

Having thus described our invention, what we claim as new, and desire to secure by Letters Patent, is—

The herein-described swinging gate comprising a post, a pivoted bar revolubly mounted thereon, brackets extending horizontally from said post, a gate mounted to slide vertically on said pivoted bar, a lever to raise and lower the gate, a curved bar 10 secured to the front end of the gate and extending backward and upward above the gate and pivotally connected to said lever, a latch-bar adapted to be simultaneously retracted when the gate is opened, a lever connected to said latch, a latch-post, pivoted gravity-operated keeper-plates arranged on said post to receive the end of said latch-bar when the gate is in closed position, a spring 19 secured to said lever 17 and flexible connections between said bar 17 and the operating-lever for opening and closing the gate, substantially as described.

In testimony whereof we have hereunto set our hands in presence of two subscribing witnesses.

WILLIAM H. MITCHELL.
JOSHUA A. ISAMAN.

Witnesses:
F. A. BALD,
G. L. RHEA.